United States Patent
Gillespie et al.

(10) Patent No.: US 10,717,007 B2
(45) Date of Patent: Jul. 21, 2020

(54) SYSTEM AND METHOD FOR MANAGING BONUSES IN A MULTI-PLAYER ONLINE GAME

(71) Applicant: MZ IP Holdings, LLC, Palo Alto, CA (US)

(72) Inventors: Garth Gillespie, Palo Alto, CA (US); Nathan Spencer, Redwood City, CA (US); Yan Zhang, Mountain View, CA (US)

(73) Assignee: MZ IP Holdings, LLC, Palo Alto, CA (US)

(*) Notice: Subject to any disclaimer, the term of this patent is extended or adjusted under 35 U.S.C. 154(b) by 31 days.

(21) Appl. No.: 15/845,119

(22) Filed: Dec. 18, 2017

(65) Prior Publication Data
US 2018/0200629 A1 Jul. 19, 2018

Related U.S. Application Data (60) Provisional application No. 62/447,031, filed on Jan. 17, 2017.

(51) Int. Cl.
| | |
|---|---|
| A63F 13/69 | (2014.01) |
| A63F 13/67 | (2014.01) |
| A63F 13/798 | (2014.01) |
| A63F 13/46 | (2014.01) |
| A63F 13/58 | (2014.01) |
| A63F 13/822 | (2014.01) |
| A63F 13/75 | (2014.01) |

(52) U.S. Cl.
CPC ............. *A63F 13/69* (2014.09); *A63F 13/46* (2014.09); *A63F 13/58* (2014.09); *A63F 13/75* (2014.09); *A63F 13/798* (2014.09); *A63F 13/822* (2014.09); *A63F 13/67* (2014.09); *A63F 2300/5533* (2013.01)

(58) Field of Classification Search
CPC ........ A63F 13/69; A63F 13/67; A63F 13/798; A63F 13/46; A63F 13/58; A63F 13/75; A63F 13/822; A63F 2300/5533
See application file for complete search history.

(56) References Cited

U.S. PATENT DOCUMENTS 6,319,125 B1 * 11/2001 Acres ...................... G07F 17/32
463/25
6,533,663 B1 * 3/2003 Iwao ...................... A63F 13/10
463/32

(Continued)

OTHER PUBLICATIONS

Int'l Search Report and Written Opinion of the ISA/EP in PCT/US2018/013517; dated Apr. 24, 2018; 13 pgs.

*Primary Examiner* — David L Lewis
*Assistant Examiner* — Matthew D Hoel
(74) *Attorney, Agent, or Firm* — Goodwin Procter LLP (57) ABSTRACT

Implementations of the present disclosure are directed to a method, a system, and an article for managing bonuses in a multi-player online game. The method can include: providing an online game in which a plurality of users interact with a virtual environment; determining a plurality of user conditions for the users in the virtual environment; determining, based on the user conditions, a plurality of bonuses that influence capabilities of the users in the virtual environment; determining each user's capabilities in the virtual environment based on the plurality of bonuses.

20 Claims, 3 Drawing Sheets

(56) References Cited

U.S. PATENT DOCUMENTS

| | | | | |
|---|---|---|---|---|
| 8,002,623 | B2* | 8/2011 | Resnick | G07F 17/3202 |
| | | | | 463/12 |
| 8,328,610 | B2* | 12/2012 | Shimura | A63F 13/10 |
| | | | | 463/9 |
| 2003/0032479 | A1* | 2/2003 | LeMay | G07F 17/32 |
| | | | | 463/32 |
| 2003/0157985 | A1* | 8/2003 | Shteyn | A63F 13/10 |
| | | | | 463/42 |
| 2006/0287058 | A1* | 12/2006 | Resnick | G07F 17/3202 |
| | | | | 463/19 |
| 2007/0087815 | A1* | 4/2007 | Van Luchene | A63F 13/792 |
| | | | | 463/25 |
| 2007/0087822 | A1* | 4/2007 | Van Luchene | A63F 13/792 |
| | | | | 463/25 |
| 2007/0087831 | A1* | 4/2007 | Van Luchene | G07F 17/3255 |
| | | | | 463/42 |
| 2007/0087835 | A1* | 4/2007 | Van Luchene | A63F 13/12 |
| | | | | 463/43 |
| 2010/0022301 | A1* | 1/2010 | Carpenter | A63F 13/12 |
| | | | | 463/30 |
| 2010/0313147 | A1* | 12/2010 | Hartman | A63F 13/12 |
| | | | | 715/757 |
| 2011/0143828 | A1* | 6/2011 | Bacos | G06Q 50/22 |
| | | | | 463/1 |
| 2014/0106883 | A1* | 4/2014 | Van Luchene | G07F 17/32 |
| | | | | 463/31 |
| 2015/0138099 | A1* | 5/2015 | Major | A63F 13/211 |
| | | | | 345/173 |
| 2015/0246285 | A1* | 9/2015 | Branson | A63F 13/537 |
| | | | | 463/31 |

* cited by examiner

SYSTEM AND METHOD FOR MANAGING BONUSES IN A MULTI-PLAYER ONLINE GAME

CROSS-REFERENCE TO RELATED APPLICATIONS

This application claims the benefit of U.S. Provisional Patent Application No. 62/447,031, filed Jan. 17, 2017, the entire contents of which are incorporated by reference herein.

BACKGROUND

The present disclosure relates to multi-player online games and, in particular, to systems and methods for managing bonuses in multi-player online games.

In general, a multi-player online game can be played by hundreds of thousands or even millions of players who use client devices to interact with a virtual environment for the online game. The players are typically working to accomplish tasks, acquire assets, or achieve a certain score or level in the online game. Some games require or encourage players to form groups or teams that can play against other players or groups of players.

In a typical example, the players have certain capabilities to perform tasks and acquire virtual items or other assets in the virtual environment. These capabilities can change over time as players become more proficient or reach more advanced levels in the game.

SUMMARY

In general, the systems and methods described herein can be used to manage bonuses for a multi-player online game in which users interact with a virtual environment. Each bonus is preferably linked to one or more user conditions and one or more user capabilities. When the one or more user conditions for a bonus are satisfied, the corresponding user capabilities can be adjusted according to the bonus. The bonus can be or include, for example, a numerical value representing an adjustment (e.g., a 50% increase) to the one or more user capabilities. Alternatively or additionally, the bonus can be or include a gating parameter than can unlock the one or more user capabilities when the one or more corresponding user conditions are satisfied.

Advantageously, the approach described herein greatly simplifies the ability of game designers and programmers to adjust user capabilities according to user conditions. The approach can facilitate the process of adding new user conditions and/or user capabilities to the game. The approach can also make it easier for game designers and programmers to adjust the influence that one or more user conditions can have on one or more corresponding user capabilities. Additionally or alternatively, the approach can make it easier for game designers and programmers to manage user conditions. For example, the use of bonuses, as described herein, can facilitate the process of determining user capabilities. This, in turn, can simplify and clarify the process of determining how user actions, which depend on user capabilities, can influence and/or change user conditions. As user conditions change, the bonuses can be used to further update user capabilities, which can influence the actions users can take to further change user conditions. This process of updating user capabilities and user conditions can continue for as long as users interact with and/or advance in the online game.

Further, the approach described herein can greatly improve the efficiency and accuracy with which a computer system can determine or compute user conditions and user capabilities and implement the conditions and capabilities in the online game. This is particularly true in the context of a massively multiplayer online game, in which thousands or millions of players can each have hundreds, thousands, or millions of user conditions and/or user capabilities. A substantial portion (e.g., 5%, 10%, 20%, or more) of computer resources can be devoted to the management and implementation of user conditions and user capabilities in this context. The approach described herein can achieve a significant reduction (e.g., a factor of 2, 10, or more) in computation times for such tasks.

In one aspect, the subject matter described in this specification relates to a computer-implemented method. The method includes: providing an online game in which a plurality of users interact with a virtual environment; determining a plurality of user conditions for the users in the virtual environment; determining, based on the user conditions, a plurality of bonuses that influence capabilities of the users in the virtual environment; and determining each user's capabilities in the virtual environment based on the plurality of bonuses and the plurality of user conditions.

In certain examples, the plurality of user conditions can include at least one of a user asset and a previous task performed by a user. The plurality of user conditions can include at least one of a temporary user condition and a permanent user condition. The plurality of bonuses can include a permanent bonus, a temporary bonus, and/or a time-varying bonus. Each bonus in the plurality of bonuses can include a scope, and the scope can identify one or more users associated with the bonus. The scope can include at least one of a team of users and a region in the virtual environment.

In various implementations, determining the plurality of bonuses can include using each bonus in the plurality of bonuses to map one or more of the user conditions to one or more of the user capabilities. Determining the plurality of bonuses can further include defining how each mapped user condition influences a corresponding mapped user capability. The user capabilities can include at least one of an ability of a user to perform a task in the virtual environment and an ability of a user to acquire a virtual item in the virtual environment. At least one bonus in the plurality of bonuses can unlock a user capability in the virtual environment.

In another aspect, the subject matter described in this specification relates to a system. The system includes one or more computer processors programmed to perform operations including: providing an online game in which a plurality of users interact with a virtual environment; determining a plurality of user conditions for the users in the virtual environment; determining, based on the user conditions, a plurality of bonuses that influence capabilities of the users in the virtual environment; and determining each user's capabilities in the virtual environment based on the plurality of bonuses and the plurality of user conditions.

In certain examples, the plurality of user conditions can include at least one of a user asset and a previous task performed by a user. The plurality of user conditions can include at least one of a temporary user condition and a permanent user condition. The plurality of bonuses can include a permanent bonus, a temporary bonus, and/or a time-varying bonus. Each bonus in the plurality of bonuses can include a scope, and the scope can identify one or more users associated with the bonus. The scope can include at least one of a team of users and a region in the virtual environment.

In various implementations, determining the plurality of bonuses can include using each bonus in the plurality of bonuses to map one or more of the user conditions to one or more of the user capabilities. Determining the plurality of bonuses can further include defining how each mapped user condition influences a corresponding mapped user capability. The user capabilities can include at least one of an ability of a user to perform a task in the virtual environment and an ability of a user to acquire a virtual item in the virtual environment. At least one bonus in the plurality of bonuses can unlock a user capability in the virtual environment.

In another aspect, the subject matter described in this specification relates to an article. The article includes a non-transitory computer-readable medium having instructions stored thereon that, when executed by one or more computer processors, cause the computer processors to perform operations including: providing an online game in which a plurality of users interact with a virtual environment; determining a plurality of user conditions for the users in the virtual environment; determining, based on the user conditions, a plurality of bonuses that influence capabilities of the users in the virtual environment; and determining each user's capabilities in the virtual environment based on the plurality of bonuses and the plurality of user conditions.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims

DETAILED DESCRIPTION

Figure 1:
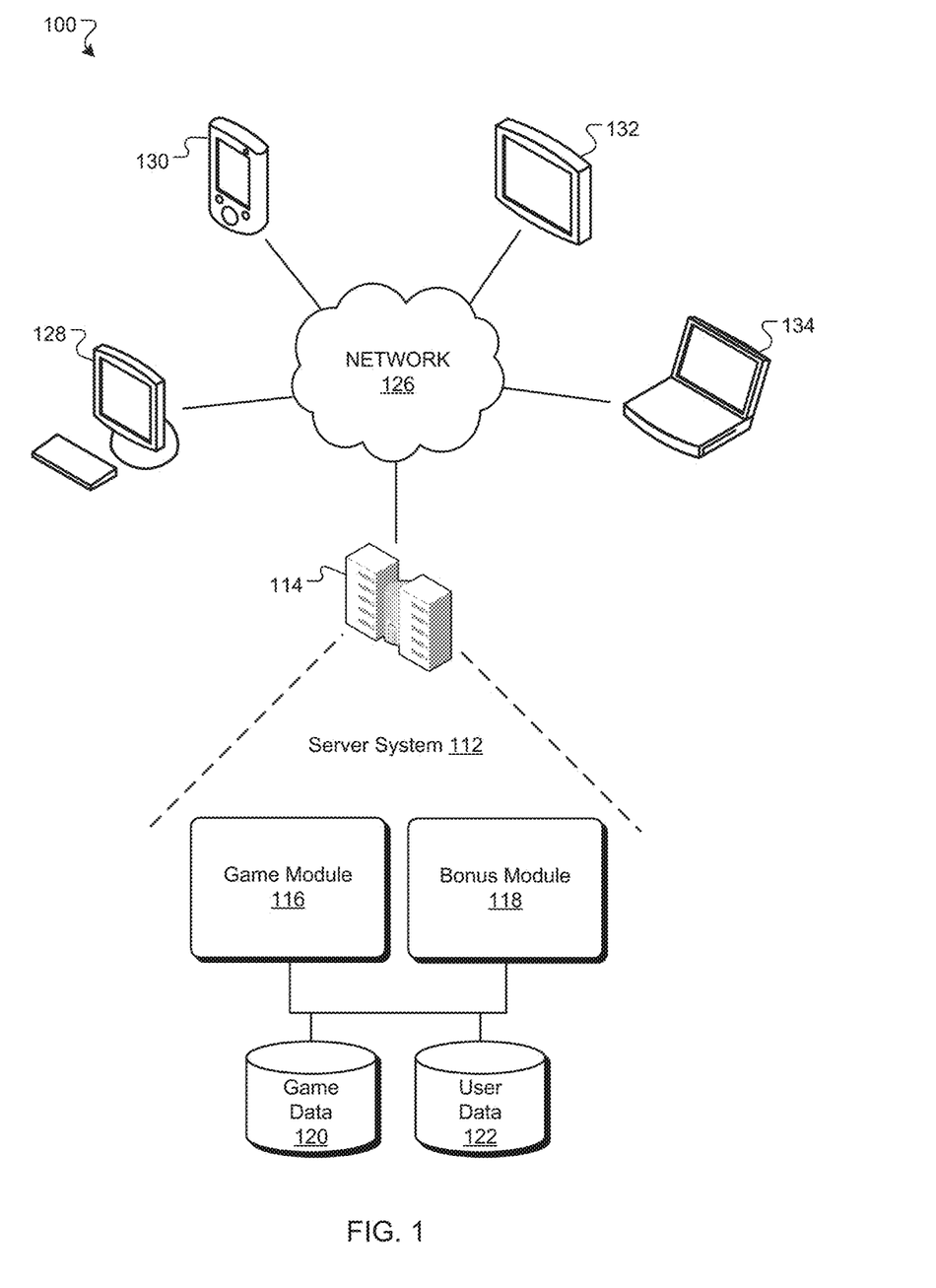
FIG. 1 is a schematic diagram of an example system for managing bonuses in a multi-player online game.

FIG. 1 illustrates an example system 100 for managing bonuses in a multi-player online game. A server system 112 provides functionality for determining bonus values and applying the bonus values according to various input parameters. The server system 112 includes software components and databases that can be deployed at one or more data centers 114 in one or more geographic locations, for example. The server system 112 software components can include a game module 116 and a bonus module 118. The software components can include subcomponents that can execute on the same or on different individual data processing apparatus. The server system 112 databases can include game data 120 and user data 122 databases. The databases can reside in one or more physical storage systems. The software components and data will be further described below.

An application, such as, for example, a web-based application, can be provided as an end-user application to allow users to interact with the server system 112. The end-user application can be accessed through a network 126 (e.g., the Internet) by users of client devices, such as a personal computer 128, a smart phone 130, a tablet computer 132, and a laptop computer 124. Other client devices are possible. In alternative examples, the game data 120 and/or the user data 122 or any portions thereof can be stored on one or more client devices. Additionally or alternatively, software components for the system 100 (e.g., the game module 116 and/or the bonus module 118) or any portions thereof can reside on or be used to perform operations on one or more client devices.

FIG. 1 depicts the game module 116 and the bonus module 118 as being able to communicate with the databases (e.g., the game data 120 and the user data 122 databases). The game data 120 database generally includes information related to the multi-player online game implemented using the system 100. The game data 120 database can include, for example, information related to a virtual environment for the game, image, video and/or audio data for the game, event data corresponding to previous, current or future game events, and/or game state data defining a current state of the game. The user data 122 database generally includes data related to user interactions with the online game and/or the virtual environment. Such information can be or include, for example, a history of user connections to the system 100, user purchases, user accomplishments, user tasks, user interactions with other users (e.g., group chats), user virtual item acquisition or usage, and/or other user conditions in the virtual environment and/or real world.

In various examples, the users or players of the online game can have certain user capabilities in the virtual environment. The user capabilities can be or include, for example, moving an avatar or a virtual item or object to a different geographical location, interacting with characters or other users, attacking other users, deploying troops, defending against an attack from other users, deploying defenses, building or modifying a virtual item or object (e.g., a virtual building or other structure), developing a new skill, operating a vehicle, acquiring a virtual item (e.g., a weapon), using or interacting with a virtual item (e.g., a playing card), and performing supernatural tasks (e.g., casting a spell). Other user capabilities are possible.

In various implementations, the capabilities of a user can depend on one or more conditions for the user. For example, if the user has reached a certain level in the game (e.g., based on points, awards, or assets), the user can have certain capabilities that lower level users may not have. Additionally or alternatively, some user capabilities can become available or be adjusted when a user has performed certain tasks in the virtual environment. For example, when a user acquires a new asset (e.g., a new weapon or other virtual object), develops a new skill (e.g., by performing virtual research or other training tasks), or creates a new object (e.g., a virtual building), certain user capabilities may be unlocked or adjusted. Examples of user conditions that can influence user capabilities include, for example, a level that a user has reached in the game, a previous task performed by the user, a virtual item or object acquired or created by the user, and/or an adjustment to a virtual item or object.

In certain examples, the system 100 can use the bonus module 118 to determine how user capabilities are influenced by user conditions. The bonus module 118 can implement a plurality of bonuses that link or map each user capability to one or more user conditions. For example, referring to FIG. 2, a user can have or be associated with user conditions AA, BB, CC, DD, EE, FF, and GG and user capabilities AAA, BBB, CCC, DDD, EEE, FFF, GGG, and HHH. Bonuses A, B, C, D, E, and F can be used to map each user condition with one or more corresponding user capabilities. In the depicted example, user capability AAA is linked to user condition AA through bonus A. Likewise, user capability DDD is linked to user conditions FF and GG through bonuses D and F, respectively. The mapping of the user conditions AA, BB, CC, DD, EE, FF, and GG to user capabilities AAA, BBB, CCC, DDD, EEE, FFF, GGG, and HHH, using bonuses A, B, C, D, E, and F, is summarized in Table 1.

TABLE 1

Figure 2:
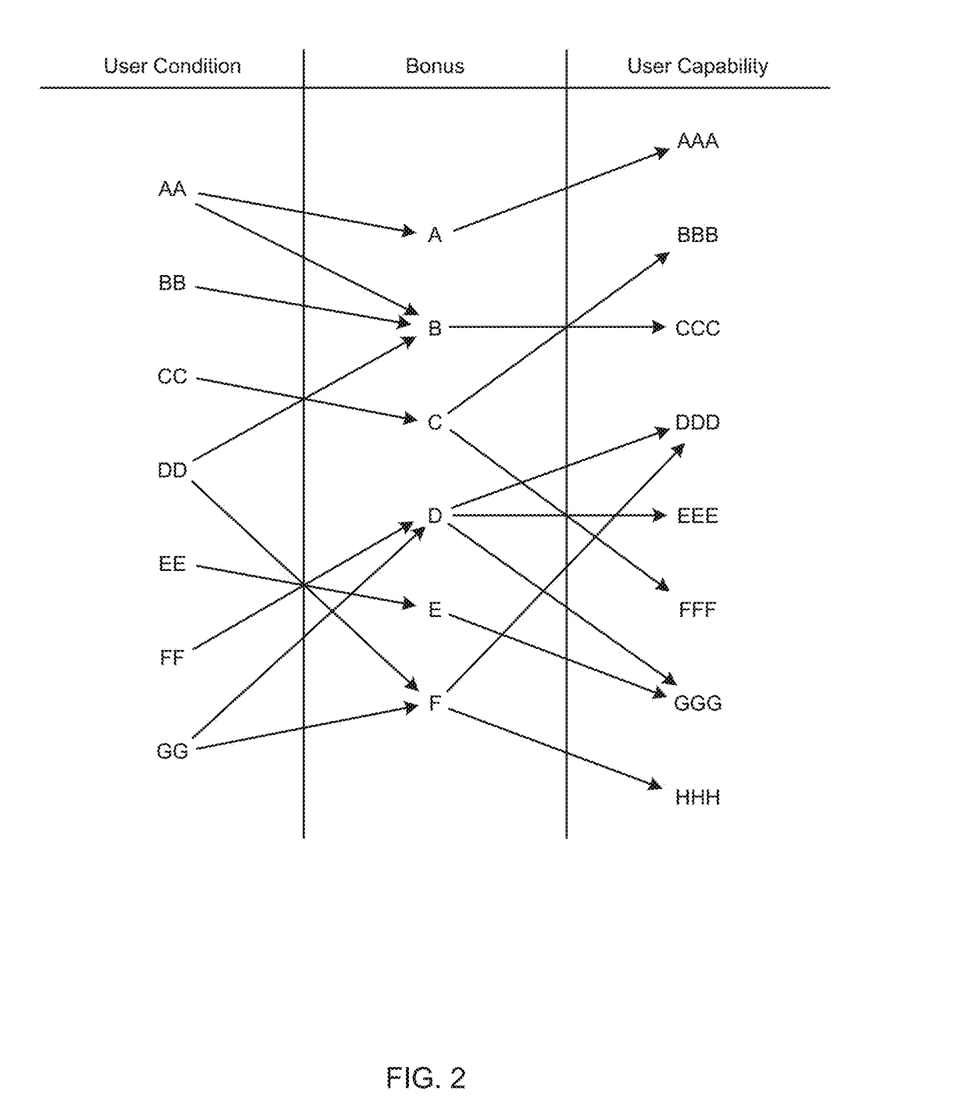
FIG. 2 is a schematic diagram in which a set of bonuses is used to map a plurality of user conditions to a plurality of user capabilities, in accordance with certain examples.

Example mapping of user conditions and user capabilities to bonus values.

| Bonus | User Conditions | User Capabilities | Bonus Value |
|---|---|---|---|
| A | AA | AAA | 20% |
| B | AA, BB, DD | CCC | 50% |
| C | CC | BBB, FFF | Gate |
| D | FF, GG | DDD, EEE, GGG | Gate |
| E | EE | GGG | 50% |
| F | DD, GG | HHH | −25% |

In general, when one or more user conditions for a bonus are satisfied, a corresponding user capability can be changed according to the bonus. When user condition AA is satisfied, for example, user capability AAA can be adjusted according to bonus A. In this case, as indicated in Table 1, a numerical bonus value for bonus A can be 20%. A corresponding 20% adjustment to user capability AAA can be, for example, a 20% increase in user strength and/or speed in the virtual environment. Likewise, when user conditions FF and GG are satisfied, user capabilities DDD, EEE, and GGG can be adjusted according to bonus D. In this case, as indicated in Table 1, bonus D represents or includes a gate or gating parameter that makes user capabilities DDD, EEE, and GGG available when user conditions FF and GG are satisfied. As a simple example, user conditions FF and GG could be a level of user achievement (e.g., level 10 or higher) and a user object (e.g., a virtual building) that, when achieved or obtained by the user, cause user capabilities DDD, EEE, and GGG to be unlocked for the user. Abilities DDD, EEE, and GGG could be, for example, a new skill (e.g., a new type of soldier), a new virtual item (e.g., a new weapon), and a new resource (e.g., virtual currency or a gold mine). In some examples, a bonus can be associated with a decrease in user capabilities. For example, when user conditions DD and GG are satisfied, user capability HHH can be decreased by the bonus value of −25% for bonus F.

In certain implementations, the influence of a user condition on a user capability can be permanent, temporary, or can vary over time. For example, when user conditions AA, BB, and DD are satisfied, user capability CCC could be adjusted permanently by 50% (the bonus value for bonus B), for the remainder of the game. Alternatively, the 50% adjustment could remain in place for a predetermined bonus period (e.g., 60 seconds, 60 minutes, or one day), after which user capability CCC could return to a previous value. The temporary adjustment could be implemented, for example, by changing the bonus value from 50% to 0% (e.g., either all at once or gradually decreasing over time) at the end of the bonus period. Alternatively or additionally, the temporary adjustment could be implemented by removing one or more of the required user conditions (e.g., AA, BB, and/or DD) when the bonus period ends. The removed user condition could be, for example, a temporary condition (e.g., a spell) that disappears after the bonus period. In some examples, a bonus value can be a function of time, for example, in the form of a ramp function, a square wave, a sine wave, or other time-varying function. In this way, the corresponding adjustment to a user condition can change over time according to the bonus value function.

In certain instances, the systems and methods described herein can be used to adjust user capabilities for single users individually or for a group of users collectively. As described herein, for example, when a single user satisfies user condition AA, user capability AAA for the user can be adjusted according to bonus A. In some instances, however, when some or all users of a group satisfy user condition AA, user capability AAA can be adjusted for the entire group (or some portion thereof) according to bonus A. Each user in the group could satisfy user condition AA, for example, when all users in the group accomplish a task together (e.g., defeat an enemy), have access to a common virtual item (e.g., a common weapon), or share some other common condition (e.g., a spell). Alternatively or additionally, user capability AAA can be adjusted for the entire group by assigning a scope to bonus A that covers the entire group. In this case, for example, when one or more users in the group satisfies user condition AA, bonus A can be applied to the one or more users and any other remaining users in the group. The approach allows all users in a group to receive the adjustment, even though all users may not satisfy the required user condition. In various examples, the group of users can be a team or an alliance of users working together in the online game to achieve a common goal. Alternatively or additionally, the group of users can be a collection of users who reside within a certain region (e.g., within a building, a room, a town, a city, a province, a country) of the virtual environment or real world. Other types of groups are possible.

In certain examples, one or more of the user conditions required for a bonus, and/or any corresponding user capabilities, can be derived from or influenced by other user conditions, bonuses, and/or user capabilities. For example, user condition AA could be considered satisfied when user conditions CC and EE are satisfied. Alternatively or additionally, user capability AAA could be a combination of user capabilities BBB, FFF, and GGG. In this way, when user conditions CC and EE are satisfied, user capabilities BBB, FFF, and GGG can be adjusted according to bonuses C and E and can be further adjusted according to bonus A. This approach of deriving certain bonuses from other bonuses can provide greater flexibility for the bonus management approach described herein.

Figure 3:
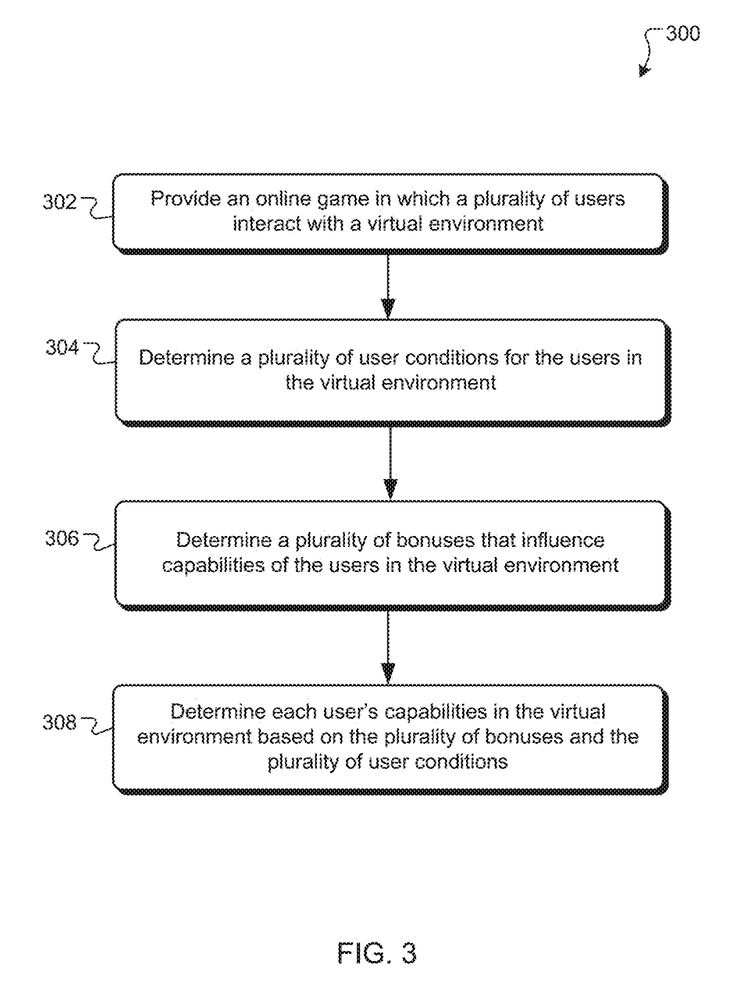
FIG. 3 is a flowchart of an example method of managing bonuses for a multi-player online game.

FIG. 3 illustrates an example computer-implemented method 300 of managing bonuses for an online game. An online game is provided (step 302) in which a plurality of users interact with a virtual environment. A plurality of user conditions are determined (step 304) for the users in the virtual environment. Based on the user conditions, a plurality of bonuses that influence capabilities of the users in the virtual environment are determined (step 306). Each user's capabilities in the virtual environment are determined (step 308) based on the plurality of bonuses and on the plurality of user conditions.

Referring again to FIG. 2 and Table 1, the bonuses, bonus values, and the corresponding mapping between user conditions and user capabilities can be stored in one or more databases (e.g., the game data 120 database) and accessed by one or more system components (e.g., the bonus module 118). As game developers or programmers expand or revise the online game to include new or modified user conditions, user capabilities, and/or bonuses, any corresponding changes can be made to the information stored in the databases. Such changes can then be read by the bonus module 118 or other system component and automatically implemented into the online game.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method comprising:
providing, using at least one server computer, an online game in which a plurality of users interact with a virtual environment using a plurality of client devices;
determining, using the at least one server computer, a set of user conditions in the virtual environment for each user from the plurality of users,
wherein determining the set of user conditions comprises updating the set of user conditions based on the user's interaction with the virtual environment using one of the client devices;
determining, using the at least one server computer, a plurality of bonuses that define capabilities of each user in the virtual environment according to the set of user conditions for the user,
wherein each bonus in the plurality of bonuses comprises at least one of (i) a numerical value representing an amount to adjust one or more of the user capabilities or (ii) a gating parameter than unlocks one or more of the user capabilities;
determining, using the at least one server computer, each user's capabilities in the virtual environment based on the plurality of bonuses and the set of user conditions for the user; and
providing, using the at least one server computer, each user with the determined user capabilities in the virtual environment.

2. The method of claim 1, wherein the set of user conditions comprises at least one of a user asset or a previous task performed by a user.

3. The method of claim 1, wherein the set of user conditions comprises at least one of a temporary user condition or a permanent user condition.

4. The method of claim 1, wherein the plurality of bonuses comprises at least one of a permanent bonus, a temporary bonus, or a time-varying bonus.

5. The method of claim 1, wherein each bonus in the plurality of bonuses comprises a scope, and wherein the scope identifies one or more users associated with the bonus.

6. The method of claim 5, wherein the scope comprises at least one of a team of users or a region in the virtual environment.

7. The method of claim 1, wherein determining the plurality of bonuses comprises:
using each bonus in the plurality of bonuses to map one or more of the user conditions to one or more of the user capabilities.

8. The method of claim 7, wherein determining the plurality of bonuses further comprises:
defining how each mapped user condition influences a corresponding mapped user capability.

9. The method of claim 1, wherein the determined user capabilities comprise at least one of an ability of a user to perform a task in the virtual environment or an ability of a user to acquire a virtual item in the virtual environment.

10. The method of claim 1, wherein at least one bonus in the plurality of bonuses unlocks a user capability in the virtual environment.

11. A system, comprising
one or more computer processors programmed to perform operations comprising:
providing, using at least one server computer, an online game in which a plurality of users interact with a virtual environment using a plurality of client devices;
determining, using the at least one server computer, a set of user conditions in the virtual environment for each user from the plurality of users,
wherein determining the set of user conditions comprises updating the set of user conditions based on the user's interaction with the virtual environment using one of the client devices;
determining, using the at least one server computer, a plurality of bonuses that define capabilities of each user in the virtual environment according to the set of user conditions for the user,
wherein each bonus in the plurality of bonuses comprises at least one of (i) a numerical value representing an amount to adjust one or more of the user capabilities or (ii) a gating parameter than unlocks one or more of the user capabilities;
determining, using the at least one server computer, each user's capabilities in the virtual environment based on the plurality of bonuses and the set of user conditions for the user; and
providing, using the at least one server computer, each user with the determined user capabilities in the virtual environment.

12. The system of claim 11, wherein the set of user conditions comprises at least one of a user asset or a previous task performed by a user.

13. The system of claim 11, wherein the set of user conditions comprises at least one of a temporary user condition or a permanent user condition.

14. The system of claim 11, wherein the plurality of bonuses comprises at least one of a permanent bonus, a temporary bonus, or a time-varying bonus.

15. The system of claim 11, wherein each bonus in the plurality of bonuses comprises a scope, and wherein the scope identifies one or more users associated with the bonus.

16. The system of claim 15, wherein the scope comprises at least one of a team of users or a region in the virtual environment.

17. The system of claim 11, wherein determining the plurality of bonuses comprises:
using each bonus in the plurality of bonuses to map one or more of the user conditions to one or more of the user capabilities.

18. The system of claim 17, wherein determining the plurality of bonuses further comprises:
defining how each mapped user condition influences a corresponding mapped user capability.

19. The system of claim 11, wherein the determined user capabilities comprise at least one of an ability of a user to perform a task in the virtual environment or an ability of a user to acquire a virtual item in the virtual environment.

20. An article, comprising:
a non-transitory computer-readable medium having instructions stored thereon that, when executed by one or more computer processors, cause the computer processors to perform operations comprising:
providing, using at least one server computer, an online game in which a plurality of users interact with a virtual environment using a plurality of client devices;
determining, using the at least one server computer, a set of user conditions in the virtual environment for each user from the plurality of users,
wherein determining the set of user conditions comprises updating the set of user conditions based on the user's interaction with the virtual environment using one of the client devices;
determining, using the at least one server computer, a plurality of bonuses that define capabilities of each user in the virtual environment according to the set of user conditions for the user,
wherein each bonus in the plurality of bonuses comprises at least one of (i) a numerical value representing an amount to adjust one or more of the user capabilities or (ii) a gating parameter than unlocks one or more of the user capabilities;
determining, using the at least one server computer, each user's capabilities in the virtual environment based on the plurality of bonuses and the set of user conditions for the user; and
providing, using the at least one server computer, each user with the determined user capabilities in the virtual environment.

* * * * *